(12) United States Patent
Ikawa et al.

(10) Patent No.: US 10,528,523 B2
(45) Date of Patent: Jan. 7, 2020

(54) VALIDATION OF SEARCH QUERY IN DATA ANALYSIS SYSTEM

(71) Applicant: INTERNATIONAL BUSINESS MACHINES CORPORATION, Armonk, NY (US)

(72) Inventors: Yohei Ikawa, Yokohama (JP); Daisuke Takuma, Nakano (JP)

(73) Assignee: International Business Machines Corporation, Armonk, NY (US)

(*) Notice: Subject to any disclaimer, the term of this patent is extended or adjusted under 35 U.S.C. 154(b) by 269 days.

(21) Appl. No.: 15/609,246

(22) Filed: May 31, 2017

(65) Prior Publication Data

US 2018/0349401 A1    Dec. 6, 2018

(51) Int. Cl.
| | | |
|---|---|---|
| *G06F 17/00* | (2019.01) | |
| *G06F 16/14* | (2019.01) | |
| *G06F 16/438* | (2019.01) | |
| *G06F 16/487* | (2019.01) | |
| *G06F 16/48* | (2019.01) | |
| *G06F 16/2455* | (2019.01) | |

(52) U.S. Cl.
CPC ...... *G06F 16/156* (2019.01); *G06F 16/24564* (2019.01); *G06F 16/438* (2019.01); *G06F 16/487* (2019.01); *G06F 16/489* (2019.01)

(58) Field of Classification Search
CPC .. G06F 3/0482; G06F 3/0485; G06F 17/2785; G06F 16/9535; G06F 3/04886; G06F 16/334
See application file for complete search history.

(56) References Cited

U.S. PATENT DOCUMENTS 8,065,319 B2    11/2011  Ding et al.
8,447,775 B2    5/2013   Vronay et al.
(Continued)

FOREIGN PATENT DOCUMENTS

IN    3852CHE2012 A    4/2016

OTHER PUBLICATIONS

Microsoft, "Logical Expressions (XQuery)," https://docs.microsoft.com/en-us/sql/xquery/logical-expressions-xquery, Mar. 14, 2017, Microsoft Docs, Printed on May 23, 2017, pp. 1-1.

(Continued)

*Primary Examiner* — Truong V Vo
(74) *Attorney, Agent, or Firm* — Jordan T. Schiller

(57) ABSTRACT

A computer-implemented method for checking a search query used for retrieving information from a collection of records in an event sequence analysis system is disclosed. The method includes receiving a search query including a plurality of predicates and one or more constraints each associated with plural predicates, in which each predicate is specified to be positive or negative, and the plurality of the predicates forms a logical graph together with the one or more constraints. The method also includes generating from the graph a subgraph including one or more predicates specified to be positive among the plurality of the predicates. The method further includes determining whether the subgraph has plural components or not, and invalidating the search query in response to the subgraph being determined to have plural components.

25 Claims, 12 Drawing Sheets

(56) References Cited

U.S. PATENT DOCUMENTS

2011/0314010 A1* 12/2011 Ganti .................. G06F 16/2425
707/728
2014/0278365 A1* 9/2014 Zhang ................. G06F 17/2785
704/9

OTHER PUBLICATIONS

Microsoft, "Logical Expressions (XQuery)," https://msdn.microsoft.com/en-us/library/ms190931.aspx, Printed on Oct. 22, 2016, pp. 1-1.

Stanford Encyclopedia of Philosophy, "Temporal Logic," First Published Monday, Nov. 29, 1999; substantive revision Wednesday, May 20, 2015, http://plato.stanford.edu/entries/logic-temporal/, Printed on Oct. 22, 2016, pp. 1-13.

Takuma et al., "Indexing Event Sequences for Medical Record Analysis," International Workshop on Pattern Recognition for Healthcare Analytics, 2012 (Best Date Available), pp. 1-4.

Zgraggen et al., "(s|qu)eries: Visual Regular Expressions for Querying and Exploring Event Sequences," CHI 2015, Apr. 18-23, 2015, Seoul, Republic of Korea, Copyright ACM, http://dx.doi.org/10.1145/2702123.2702262, pp. 1-10.

* cited by examiner

| ID | TIME | (KEY,VALUE) |
|---|---|---|
| 0 | 8/10 | (symptom, headache) A |
| 0 | 8/12 | (recover, headache) C |
| 1 | 8/3 | (symptom, headache) A |
| 1 | 8/5 | (recover, headache) C |
| 1 | 8/6 | (medicine, loxoprofen) B |
| 2 | 8/5 | (symptom, headache) A |
| 2 | 8/12 | (medicine, loxoprofen) B |
| 2 | 8/18 | (symptom, headache) A |
| 2 | 8/21 | (medicine, loxoprofen) B |
| 2 | 8/30 | (recover, headache) C |
| 3 | 8/5 | (recover, headache) C |
| 3 | 8/10 | (medicine, loxoprofen) B |

LISTS FOR A, B AND C, RESPECTIVELY

| (0, 8/10) | (1, 8/3) | (2, 8/5)  | (2, 8/18) | 296a |
| (1, 8/6)  | (2, 8/12)| (2, 8/21) | (3, 8/10) | 296b |
| (0, 8/12) | (1, 8/5) | (2, 8/30) | (3, 8/5)  | 296c |

LINKED LISTS FOR A AND C MATCHING CONSTRAINT BETWEEN A AND C

| (0, 8/10) | (1, 8/3) | (2, 8/18) | 298a |
| (0, 8/12) | (1, 8/5) | (2, 8/30) | 298c |

B's ELEMENTS MATCHING CONSTRAINT WITH A

| (1, 8/6) | (2, 8/21) | 300 |

B's ELEMENTS MATCHING FURTHER CONSTRAINT WITH C

| (2, 8/21) | 302 |

REMOVE ELEMENTS FROM A'S LISTS

| (0, 8/10) | (1, 8/3) | ~~(2, 8/18)~~ | REMOVED BY LINK |
| (0, 8/12) | (1, 8/5) | ~~(2, 8/30)~~ | |

REMOVE ELEMENTS FROM C'S LISTS

| (0, 8/10) | (1, 8/3) | 298a |
| (0, 8/12) | (1, 8/5) | 298c |

VALIDATION OF SEARCH QUERY IN DATA ANALYSIS SYSTEM

BACKGROUND

The present disclosure, generally, relates to data analysis, more particularly, to techniques for checking a search query used for retrieving information from a collection of records in a data analysis system.

Since a huge amount of data being recorded day by day, moment by moment in a variety of domains, a lot of efforts have been made to develop techniques to extract meaningful information from a collection of records. Event sequence analysis is technology for retrieving a meaningful pattern from event sequence data. Example of such event sequence data may include clinical data in hospitals, message data in social networking services, etc.

Search queries used in the event sequence analysis may include one or more predicates, each of which is used to retrieve a list for a key-value pair, and constraints between two predicates, each of which is used to extract pairs of elements having some temporal relationship from the lists for the two predicates.

Due to its complexity, typically, there has been developed a graphical user interface, on which a user can create a search query instinctively to extract a desired pattern from the event sequence data. However, in the typical graphical user interface, a combination of user's operations on a query may cause a kind of query that would lead to an unexpected result for the user. Such practically useless queries are considered as invalid even though it is syntactically correct, i.e., it may give some result regardless of the intention of the user.

In relation to graphical user interfaces for creating search queries, it has been developed a visual query interface for creating queries on sequences of data based on regular expressions (e.g., E. Zgraggen et al. (slqu)eries: Visual Regular Expressions for Querying and Exploring Event Sequences. CHI '15: Proceedings of the 33rd Annual ACM Conference on Human Factors in Computing Systems: 2683-2692. 2015). In this literature, a touch based system that exposes the full expressive power of regular expressions in an approachable way and interleaves query specification with result visualizations has been proposed. However, the literature does not mention aforementioned invalidity of resultant query.

What is needed is computer-implemented methods, associated computer systems and computer program products, capable of checking validity of a search query so as not to give a result inconsistent with intention of a user, without actually issuing the search query.

SUMMARY

According to an embodiment of the present invention there is provided a computer-implemented method for checking a search query used for retrieving information from a collection of records. The method includes receiving a search query including a plurality of predicates, each of which is specified to be positive or negative, and one or more constraints, each of which is associated with plural predicates. The plurality of the predicates forms a logical graph together with the one or more constraints. The method also includes generating from the graph a subgraph including one or more predicates specified to be positive among the plurality of the predicates in the search query. The method further includes determining whether the subgraph has plural components or not, and invalidating the search query in response to the subgraph being determined to have plural components.

According to the method of the embodiment of the present invention, even though the search query includes a predicate specified to be negative, which generally makes it difficult to notice invalidity of the search query, validity of the search query can be examined without waiting for a result obtained from the collection of the records by actually issuing the search query.

In a preferable embodiment, the method further includes, in response to the subgraph being determined to have plural components, providing an alternative query by adding a new constraint between a pair of predicates that belongs to different components in the subgraph and has a connection with each other via one or more predicates specified to be negative, in the graph. Thereby, the user can timely obtain an alternative query that is modified based on the original search query so as to give a result that is expected to be more matched with intention of the user than the original search query.

In other preferable embodiment, the method further includes deriving content of the new constraint from two or more constraints between the pair of the predicates through the one or more predicates specified to be negative. Thereby, the user can obtain an alternative query with a new constraint that is depending on the two or more constraints between the pair of the predicates to be added with the new constraint.

In further other preferable embodiment, the deriving includes calculating a strongest constraint in necessary conditions of combination of the two or more constraints between the pair of the predicates as the content of the new constraint. Thereby, the user can obtain an alternative query with a new constraint that is expected to be an appropriate one among possible constraints obtained from the two or more constraints between the pair of the predicates.

Computer systems and computer program products relating to one or more aspects of the present invention are also described and claimed herein.

According to other embodiment of the present invention there is provided a computer-implemented method for checking a search query used for retrieving information from a collection of records. The method includes receiving a search query including a plurality of predicates, each of which is specified to be positive or negative, and one or more constraints, each of which is associated with plural predicates. The plurality of the predicates forms a logical graph together with the one or more constraints. The method also includes generating from the graph a subgraph including one or more predicates specified to be positive among the plurality of the predicates in the search query. The method further includes finding a pair of predicates in the subgraph in a manner such that the predicates in the pair belong to different components in the subgraph. The method includes further, in response to finding the pair of the predicates, adding a new constraint between the pair of the predicates to provide an alternative query, in which the new constraint has content derived from two or more constraints between the pair of the predicates in the graph.

According to the method of other embodiment of the present invention, even though the search query includes a predicate specified to be negative, the user can timely obtain an alternative query so as to give a result that is expected to be more matched with intention of the user than the original search query, without waiting for a result retrieved from the collection of the records by actually issuing the search query.

The new constraint may have content depending on the two or more constraints between the pair of the predicates to be added with the new constraint.

According to another embodiment of the present invention there is provided a computer program product for providing a user interface, on which a search query used for retrieving information from a collection of records is editable. The computer program product comprises a computer readable storage medium having program instructions embodied therewith and the program instructions is executable by a computer to cause the computer to perform a following method. The method includes providing a screen of the user interface, on which a search query is graphically represented in a form of a graph. Each predicate in the search query is represented by a node. Each constraint associated with plural predicates in the search query is represented by an edge. Each predicate is specified to be positive or negative through an operation on the screen. The method also includes notifying that the search query currently being displayed is invalid if a subgraph including one or more predicates specified to be positive from among the search query has plural components.

According to the computer program product of the embodiment of the present invention, the user can be notified validity of the search query without waiting for an actual result obtained from the collection of the records by issuing the search query, even though the search query includes a predicate specified to be negative.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for checking a search query that is used for retrieving information from a collection of records in a data analysis system.

Event sequence analysis is a one of the techniques to extract insight from a collection of records, especially a meaningful pattern from event sequence data. Referring to the series of FIGS. 1-11, there are shown computer systems and methods for checking a search query for event sequence analysis according to one or more embodiments of the present invention.

Hereinafter, first referring to the series of FIGS. 1-8, it will be described a computer system and a method for checking a search query used for event sequence analysis according to an exemplary embodiment of the present invention, in which invalidity of the search query can be detected and the search query determined to be invalid can be corrected to provide an alternative search query. Then, referring to the series of FIGS. 9-11, it will be described a computer system and a method for checking a search query used for event sequence analysis according to a preferable embodiment of the present invention, in which more complex search query determined to be invalid can be corrected.

Figure 1:
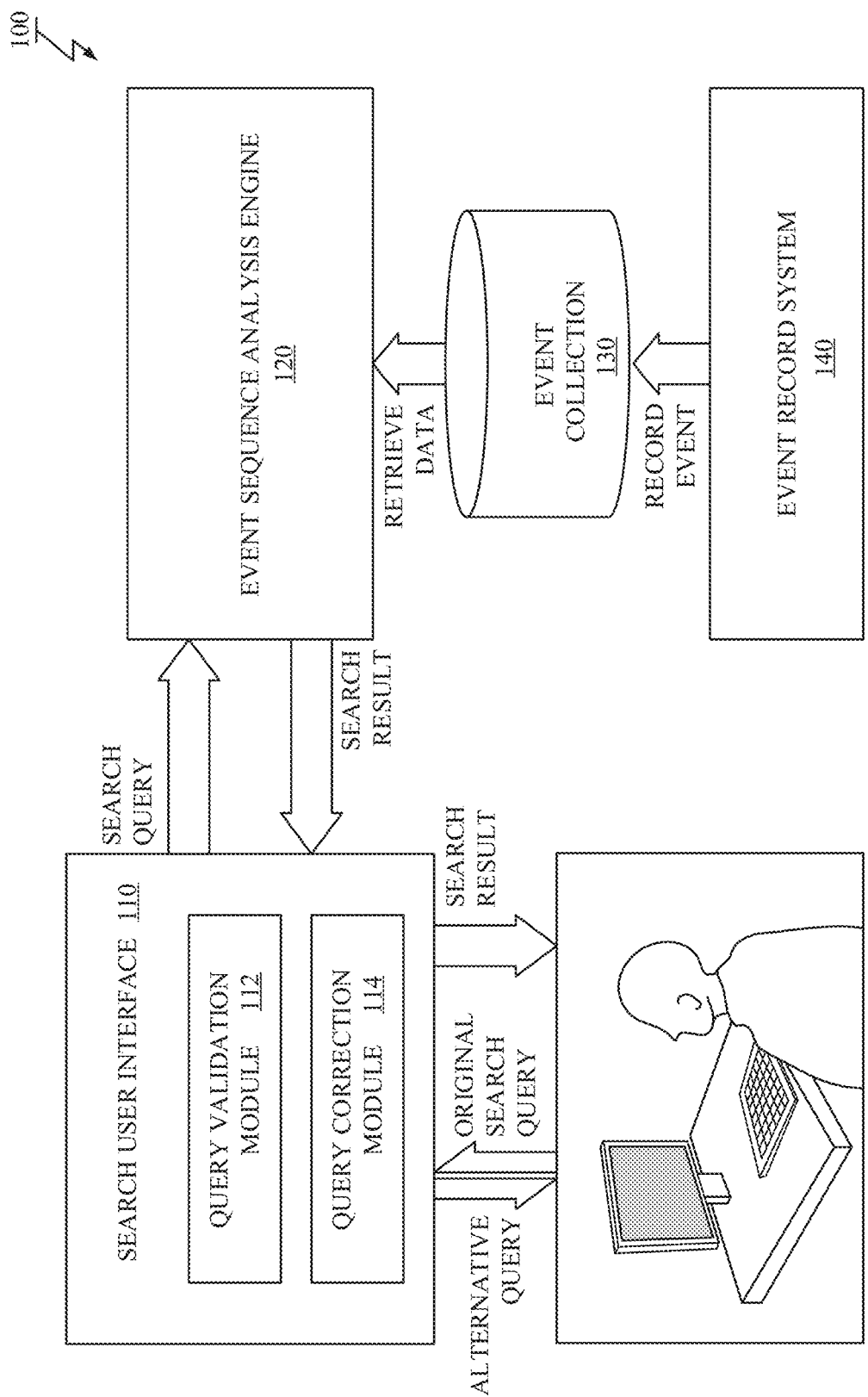
FIG. 1 illustrates a block diagram of an event sequence analysis system according to an exemplary embodiment of the present invention.

Referring to FIG. 1, a block diagram of an event sequence analysis system 100 according to an exemplary embodiment of the present invention is illustrated. As shown in FIG. 1, the event sequence analysis system 100 may include a search user interface 110 for providing a graphical user interface on which a search query is graphically editable in a form of a graph structure; an event sequence analysis engine 120 for retrieving information from event sequence data in accordance with an inputted search query; an event collection database 130 for storing the event sequence data; and an event record system 140 for recording event information into the event collection database 130.

The event record system 140 may collect event information originating from one or more event sources and record the collected event information into the event collection database 130 as records. Such event sources may include, but not limited to, electronic health record systems, social networking services, wearable devices, sensor network, etc. to name but a few.

Figures 2A, 2B:
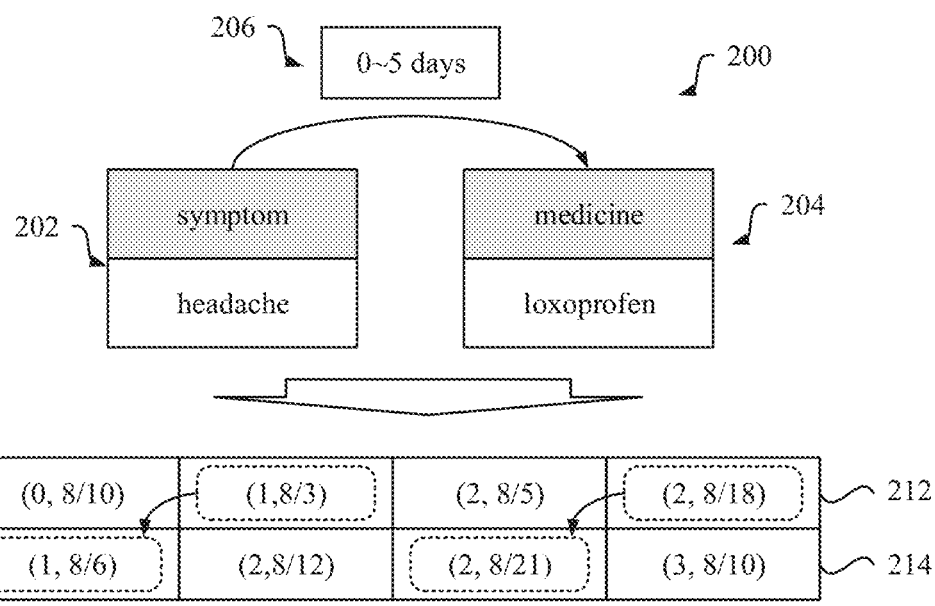
FIG. 2A shows data structure of event sequence data managed in the event sequence analysis system according to the exemplary embodiment of the present invention.
FIG. 2B describe a simple example of a search query for event sequence analysis and query processing of retrieving a list of elements matched with the search query from the event sequence data.

The event collection database 130 may store a collection of records that constitutes event sequence data in one or more storage media or devices. Referring to FIG. 2A, data structure of the event sequence data stored in the event collection database 130 is shown. The example shown in FIG. 2A is schematic clinical data as managed in a hospital.

As shown in FIG. 2A, the event sequence data includes a series of records, each of which includes an identifier field for holding an identifier of a patient; a time filed for holding occurrence time and/or date of an event regarding the patient; and a key-value pair field for holding a key-value pair describing content of the event regarding the patient. A pair of a key and corresponding value for the key-value pair field may depend on a domain from which the event sequence data has been acquired. Taking the clinical data as an example, each key may be like "symptom", "medicine" or "recover" attribute. The value for the "symptom" and "recover" attributes may include "headache", "stomachache", "slight fever", for example. The value for the "medicine" attribute may include "loxoprofen", "sucralfate", "ibuprofen", for example.

In the exemplary embodiment, each record holds a key-value pair and a search query targets records each having a specific key-value pair. However, in other embodiments, each record may hold merely a label instead of the key-value pair and the search query may target records each having a specific label.

Also, the event sequence data is not limited to the clinical data. Any kind of event sequence data including message data in social networking services, sensor data in sensor network, and the like can be a target of event sequence analysis. Taking the message data in the social networking services as another example, each key may be like "food" or "adjective" attribute. The value for the "food" attribute may include "cookie", "pancake", for example. The value for the "adjective" attribute may include "delicious", "juicy", for example.

Referring back to FIG. 1, the search user interface 110 is configured to receive a search query from a user and issue a search query to the event sequence analysis engine 120. The search query may include a plurality of predicates and one or more constraints. Each predicate is used to retrieve a list of elements having a specific key-value pair designated by each predicate. Each constraint is associated with a pair of predicates and used to extract pairs of respective elements satisfying each constraint from respective lists for the predicates associated with each constraint. Each constraint is a relative condition on a pair of the elements and may include an interval (that represents a range of values between minimum and maximum) of a time gap between the predicates associated with each constraint. Thus, pairs of respective elements having some temporal relationship (e.g. a pair of one event and other event occurred in 5 days) would be extracted from respective lists for the predicates associated with each constraint.

In the exemplary embodiment, each constraint further includes a condition on identifiers identifying objects regarding events (e.g., having the same patient ID as for clinical data, having the same sensor ID or sensor group ID as for sensor data, etc.) since the event sequence data includes records originating from multiple sources. However, content of the constraint may not be limited to the specific example described above. In other embodiments, the condition on the identifiers can be omitted if the event sequence data includes data originating from merely a single source. For example, personal health log data acquired by using a wearable device may include event data originating from single person who wears the wearable device. Also, the target of the search query may not be limited to the event sequence data. In other embodiments, any kind of collection of records can be a target for data analysis. For example, location information of places (stores, restaurants, hotels, etc.) can be a target. Accordingly, content of the constraint is not limited to the aforementioned example. In other embodiments, each constraint may include an interval of distance between predicates. As for the location information of the places, the constraint may include an interval of geographical distance between predicates (e.g. a pair of a shop and a station located within a 1 km).

In a particular embodiment, the search user interface 110 may be configured to provide an editing screen of the user interface, on which a search query is graphically represented and editable in a form of a graph, that is made up of nodes which are connected by edges. On the editing screen of the user interface, each predicate is represented by a node and each constraint associated with two predicates is represented by an edge associated with two nodes corresponding to the two predicates. The search user interface 110 may also be configured to receive a request for issuing the search query created on the editing screen and to display a search result for the search query on a screen of the user interface.

The event sequence analysis engine 120 may receive the search query from the search user interface 110, retrieve information matched with the search query and return the result for the search query to the search user interface 110.

Referring to FIG. 2B, it is depicted a simple example of a search query for the event sequence analysis and query processing of retrieving a list of elements matched with the search query from the event sequence data.

As shown in FIG. 2B, the example of the search query 200 includes two predicates 202, 204 ("symptom—headache" and "medicine—loxoprofen") with a constraint 206 ("0~5 days") therebetween. Note that, in the example shown in FIG. 2B, the constraint 206 includes implicit condition that the patient IDs are identical between the two predicates in addition to the interval of the time gap between the two predicates. This search query 200 can be used to retrieve a list of pairs of elements satisfying a statement like "patients who had headache and were prescribed loxoprofen in 5 days".

The query processing of this search query 200 may include:
(i) a step of retrieving a list 212 for the first predicate 202 ("symptom—headache") from the event sequence data;
(ii) a step of retrieving a list 214 for the second predicate 204 ("medicine—loxoprofen") from the event sequence data; and
(iii) a step of extracting pairs of an element in the list 212 and a corresponding element in the list 214 that occurs within 5 days from the element in the list 212, as indicated by pairs of dashed circles connected by an arrow in FIG. 2B.

In the exemplary embodiment, each predicate may be specified to be positive, i.e. retrieving a list of elements that are matched with the predicate for inclusion, or negative, i.e., for exclusion. Whether the predicate is positive or negative can be specified through operations on the editing screen provided by the search user interface 110. In a particular embodiment, each predicate has a NOT option by which the predicate is specified to be positive or negative. If the NOT option of a predicate is set to be false, the predicate (without NOT option) is specified to be positive, and referred to as a positive (or affirmative) predicate. On the other hand, if the NOT option is set to be true the predicate (with NOT option) is specified to be negative and referred to as a negative predicate, which means the negation of the predicate.

By using the aforementioned user interface, user can easily create desired search query for the event sequence analysis. However, a certain combination of user's operations such as (1) addition of a new predicate with a constraint; (2) deletion of a predicate, (3) setting to set a NOT option of a predicate to true, can create a kind of query that leads to an unexpected result for the user even though it is syntactically correct. These practically useless queries can be considered as "invalid" in the sense that the search query leads a result inconsistent with user's intention. Especially, the presence of the negative predicate makes it difficult to notice the invalidity of the search query for the user since even a query having a connected graph structure can be invalid if the query includes a negative predicate.

Figure 3A:
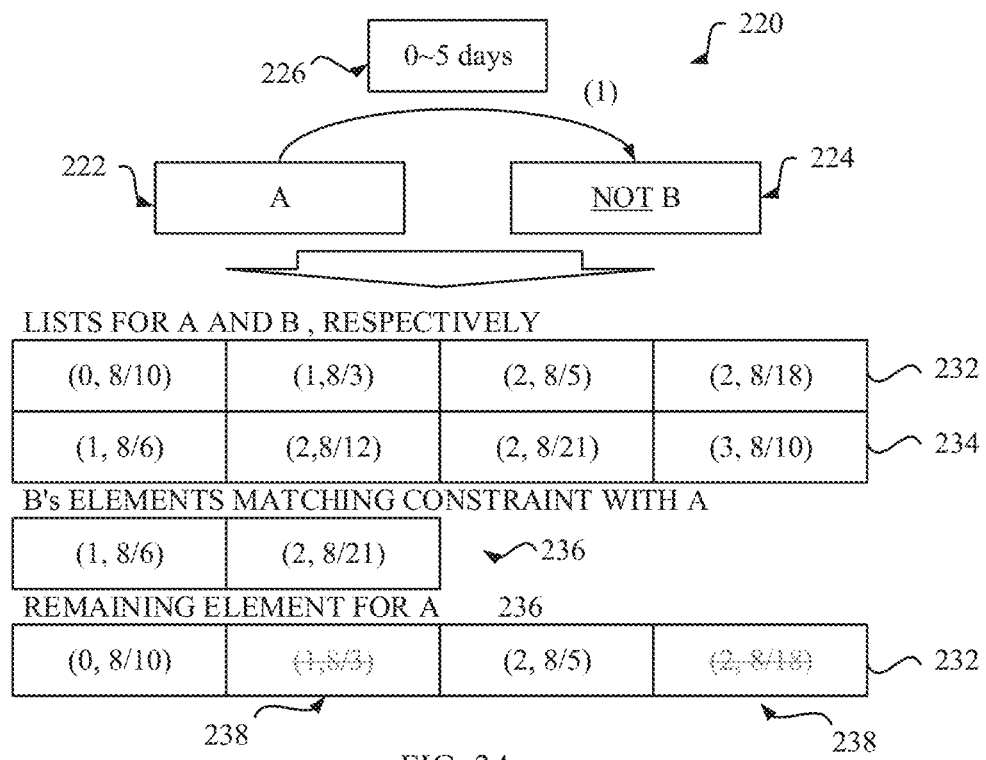
FIGS. 3A and 3B show examples of a search query with a negative predicate for the event sequence analysis and examples of query processing of retrieving a list of elements matched with the search query from the event sequence data.
Figure 3B:
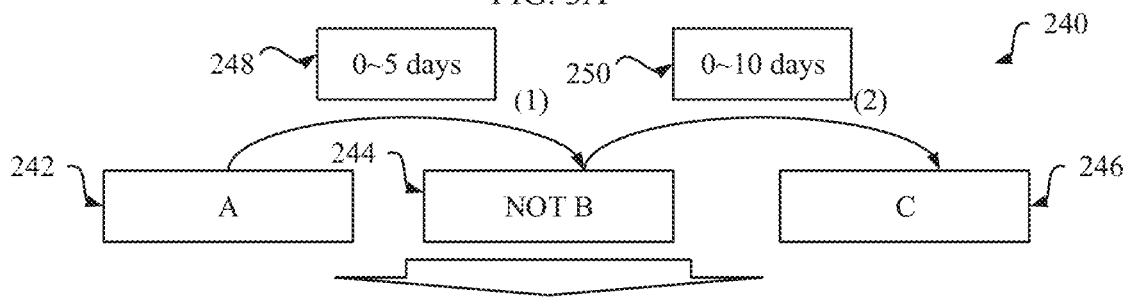

Referring to FIGS. 3A and 3B, examples of a search query with a negative predicate for the event sequence analysis and examples of query processing of retrieving a list of elements matched with the search query from the event sequence data are illustrated. FIG. 3A illustrates a valid case whereas FIG. 3B illustrates an invalid case.

Generally, the constraints have an order to be processed and the NOT option may be processed after all the constraints are processed. As shown in FIG. 3A, the example of the search query 220 includes one positive predicates 222 (denoted by "A" in FIG. 3A, which represents the key-value pair "symptom-headache" without NOT option) and one negative predicate 224 (denoted by "B" with a NOT option in FIG. 3A, which represents the key-value pair "medicine-loxoprofen") with a constraint 226 ("0~5 days"). The search query 220 can be used to retrieve a list of pairs of elements satisfying statement like "patients who had headache but were not prescribed loxoprofen in 5 days".

The query processing of this search query 220 may include:
(i) a step of retrieving the list 232 for the predicate 222 (A) from the event sequence data;
(ii) a step of retrieving the list 234 for the predicate 224 (B) from the event sequence data;
(iii) a step of determining zero or more elements 236 in the list 234 (B) that match the constraint 226 with the positive predicate 222(A); and
(iv) a step of removing zero or more elements 238 from the list 232 (A) that have one or more respective elements 236 in the list 234 (B) in 5 days.

In the case described in FIG. 3A, the event sequence analysis engine 120 can return a result consistent with user's intent as the aforementioned statement makes sense.

On the other hand, the example of the search query 240 shown in FIG. 3B includes one positive predicates 242 (denoted by "A" in FIG. 3B), one negative predicate 244 (denoted by "B" in FIG. 3B with a NOT option) with a constraint 248 ("0~5 days") and other positive predicate 246 (denoted by "C" in FIG. 3B, which represents the key-value pair "recover-headache") with a constraint 250 ("0~10" days).

The query processing of this search query 240 may typically include:
(i) a step of retrieving the list 252 for the predicate 242 (A) from the event sequence data;
(ii) a step of retrieving the list 254 for the predicate 244 (B) from the event sequence data;
(iii) a step of retrieving the list 256 for the predicate 246 (C) from the event sequence data;
(iv) a step of determining zero or more elements 258 in the list 254 (B) that match the constraint 248 with the positive predicate 242 (A);
(v) a step of determining zero or more elements 260 in the list 254 (B) that matches further the constraint 250 with the positive predicate 246 (C);
(vi) a step of removing zero or more elements 262 from the list 252 (A) that have one or more respective elements in the list 260 for the predicate 244 (B); and
(vii) a step of removing zero or more elements 264 from the list 256 (C) that have one or more respective elements in the list 260 for the predicate 244 (B).

In the case described in FIG. 3B, the event sequence analysis engine 120 would return a result including two lists of remaining elements for the positive predicates 244, 246 (A, C) or combinations of the lists (A, C) that may be so called cross joint, both of which may be inconsistent with user's intent.

By issuing the search query to the event sequence analysis engine 120, the user can be aware of such invalidity of the search query since the user gets an unexpected result, or the user does not get any result due to timeout. Thus, the user would wait for an actual response from the event sequence analysis engine 120 for at least a certain period of time.

Therefore, in the exemplary embodiment, the search user interface 110 provides functionalities, in which invalidity of the search query can be examined without waiting for an actual response by issuing the search query.

Referring back to FIG. 1, the search user interface 110 may include a query validation module 112 for validating the search query; and a query correction module 114 for correcting the search query to provide an alternative search query when the original search query is determined to be invalid.

In order to validate the search query, the query validation module 112 is configured to generate a subgraph G1 from the graph G2 of the original search query in a manner such that the subgraph G1 is made up of a subset of the predicates in the graph G2, that is one or more positive predicates among the predicates in the original search query. The subgraph G1 can be generated by copying the graph G2 and removing negative predicates and constraints connected thereto from a copy of the graph G2. Alternatively, the subgraph G1 can be generated by extracting positive predicates and constraints therebetween from the graph G2 while excluding negative predicates and constraints thereto. The subgraph G1 whose nodes and edges represent the positive predicates (i.e., predicates without a NOT option) and the constraints between them respectively are generated for checking the validity of the original search query.

The query validation module 112 may validate the original search query by using the graph G2 representing the original search query and the subgraph G1 generated therefrom. The query validation module 112 may determine that the original search query is invalid and give up providing the alternative search query if the graph G2 itself is determined to be disconnected. The query validation module 112 may determine that the original search query is valid if both the graph G2 and the subgraph G1 are determined to be connected. The query validation module 112 may invalidate the original search query but request the query correction module 114 to modify the original search query if the subgraph G1 has plural components, i.e. the subgraph G1 is determined to be disconnected but the graph G2 is determined to be connected.

The query correction module 114 may be configured to perform correction of the original search query to provide an alternative search query if the subgraph G1 is determined to be disconnected but the graph G2 is determined to be connected, i.e., it is determined that the original search query is invalid but can be corrected. In order to provide the alternative search query for the original search query, the query correction module 114 may be configured to find a pair of positive predicates belonging to different connected components in the subgraph G1 and to add a new constraint between the pair of the positive predicates. The query correction module 114 may also be configured to derive content of the new constraint. The correction of the search query will be described in more detail by referring to following flowcharts.

Figure 4:
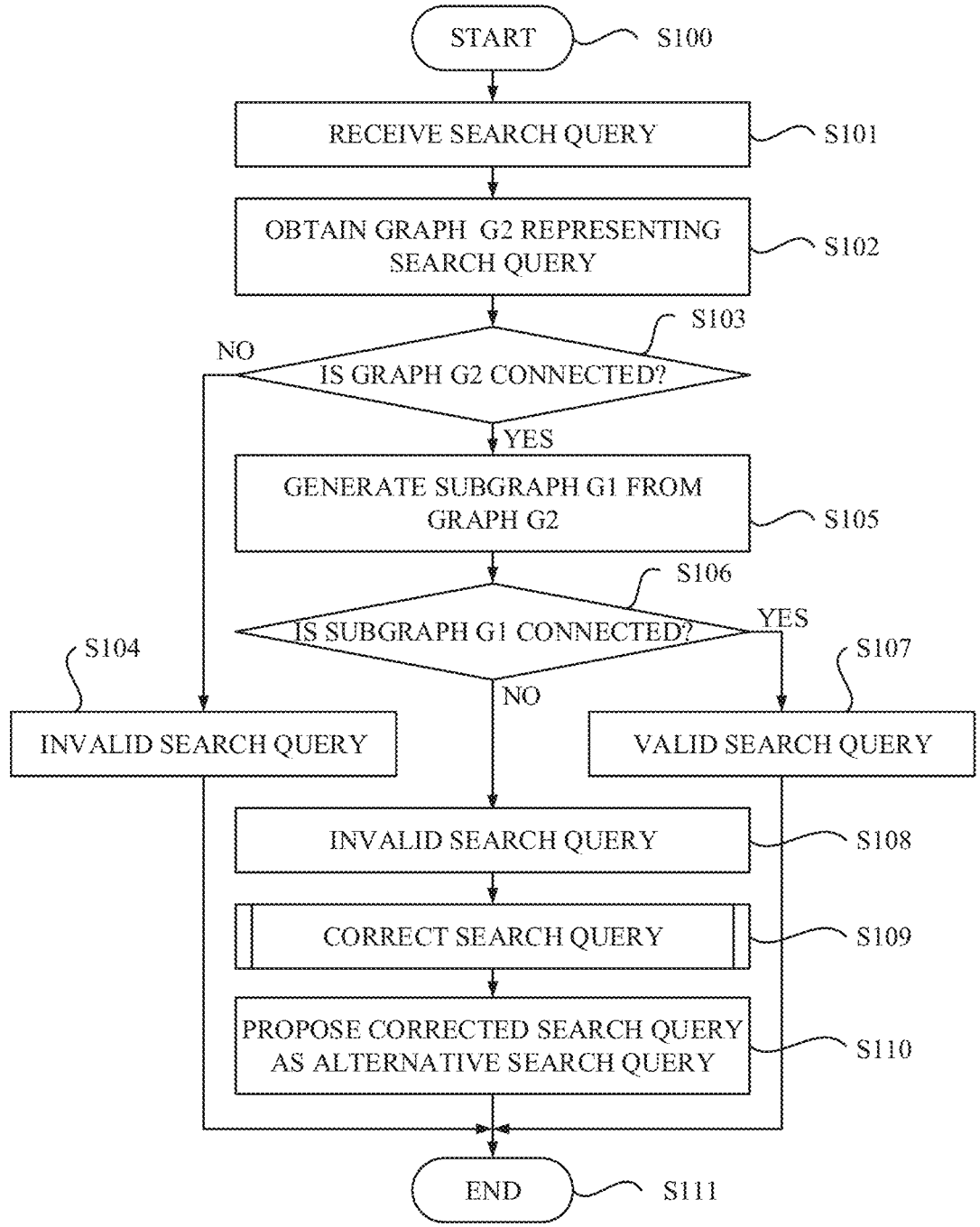
FIG. 4 is a flowchart depicting a process for checking a search query used for retrieving information from the event sequence data according to the exemplary embodiment of the present invention.

Referring to FIG. 4, a process for checking a search query used for retrieving information from the event sequence data is shown in more detail. Note that the process shown in FIG. 4 may be executed by a processing unit that implements the query validation module 112 shown in FIG. 1.

The process shown in FIG. 4 may begin at step S100 in response to receiving a request for checking a search query from a user. The user may explicitly or implicitly request the search user interface 110 to check the search query being displayed on the screen. For example, manipulations of the search query such as adding a predicate and/or a constraint, set NOT option to be true or false, changing the content of the constraint may invoke the check processing of the search query.

At step S101, the processing unit may receive a search query including one or more predicates and one or more constraints.

Figure 6A:
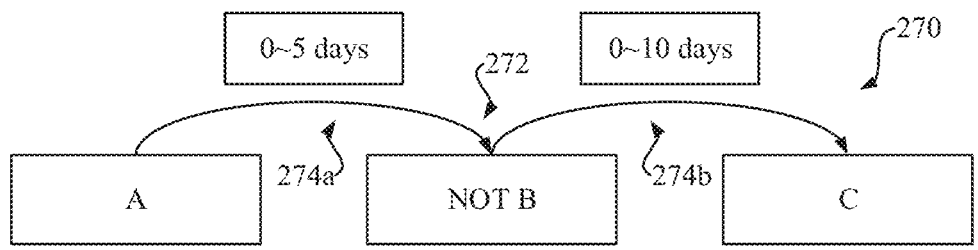
FIGS. 6A, 6B, 6C, and 6D describe an example of processing of correcting the search query according to the exemplary embodiment of the present invention.

At step S102, the processing unit may obtain the graph G2 representing the original search query, in which each positive or negative predicate is represented by a node and each constraint associated with a pair of predicates is represented by an edge associated with a corresponding pair of nodes. FIG. 6A shows an example of the graph 270 representing the original search query.

At step S103, the processing unit may determine whether the graph G2 is connected or disconnected. In response to the graph G2 being determined to be disconnected (S103: NO), control may transfer to step S104. At step S104, the processing unit may invalidate the search query and control may proceed directly to step S111 to end the process with giving up providing an alternative search query. The queries in this condition would not be processed.

On the other hand, in response to the graph G2 being determined to be connected (S103: YES), control may transfer to step S105. At step S105, the processing unit may generate further a subgraph G1 from the graph G2 by copying the graph G2 and removing negative predicates and constraints connected thereto from a copy of the graph G2, or by extracting positive predicates and constraints therebetween from the graph G2 while excluding negative predicates and constraints thereto. The subgraph G1 may be made up of one or more positive predicates among the predicates in the search query, i.e., the subgraph G1 is a so-called induced subgraph of the graph G2, which includes a subset of nodes corresponding to the positive predicates (without "NOT" option) and edges connecting pairs of nodes in that subset, which correspond to constraints between the pairs of the positive predicates in the search query.

Figure 6B:
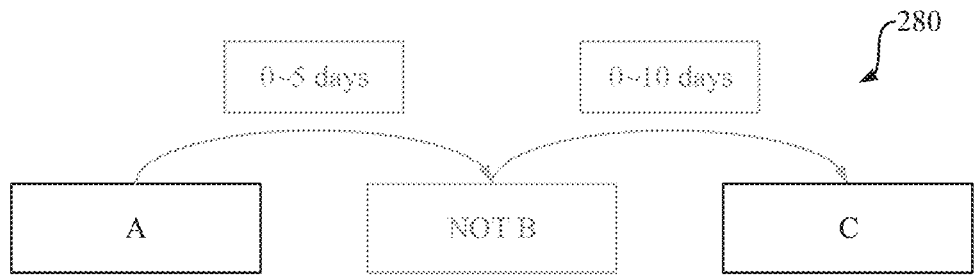

FIG. 6B shows an example of the subgraph 280 generated from the graph 270 shown in FIG. 6A. By comparing FIGS. 6A and 6B, the negative predicate 272 and constraints 274a, 274b provided thereto are removed from the graph 270 to form the subgraph 280.

At step S106, the processing unit may determine whether the subgraph G1 has plural connected components or a single connected component, i.e., the subgraph G1 is disconnected or connected. Note that each connected component in the subgraph G1 is a subgraph of the subgraph G1, in which any two nodes are connected by paths but any node is connected to no additional nodes in the subgraph G1. A node associated with no edges is also a connected component. In response to the subgraph G1 being determined to have single connected component (S106: YES), control may transfer to step S107. At step S107, the processing unit may determine that the search query is valid as it is and control may proceed directly to step S111 to end the process. The queries in this condition would be issued to the event sequence analysis engine 120 and processed.

On the other hand, in response to the subgraph G1 being determined to have plural connected components (S106: NO), control may transfer to step S108. At step S108, the processing unit may invalidate the search query. At step S109, the processing unit may invoke correction of the search query to provide an alternative search query. The correction of the search query will be described later in more detail by referring to FIG. 5. At step S110, the processing unit may propose a corrected search query that is modified from the original search query as an alternative search query, and control may proceed to step S111 to end the process. The queries in this condition would be issued to the event sequence analysis engine 120 and processed.

Figure 5:
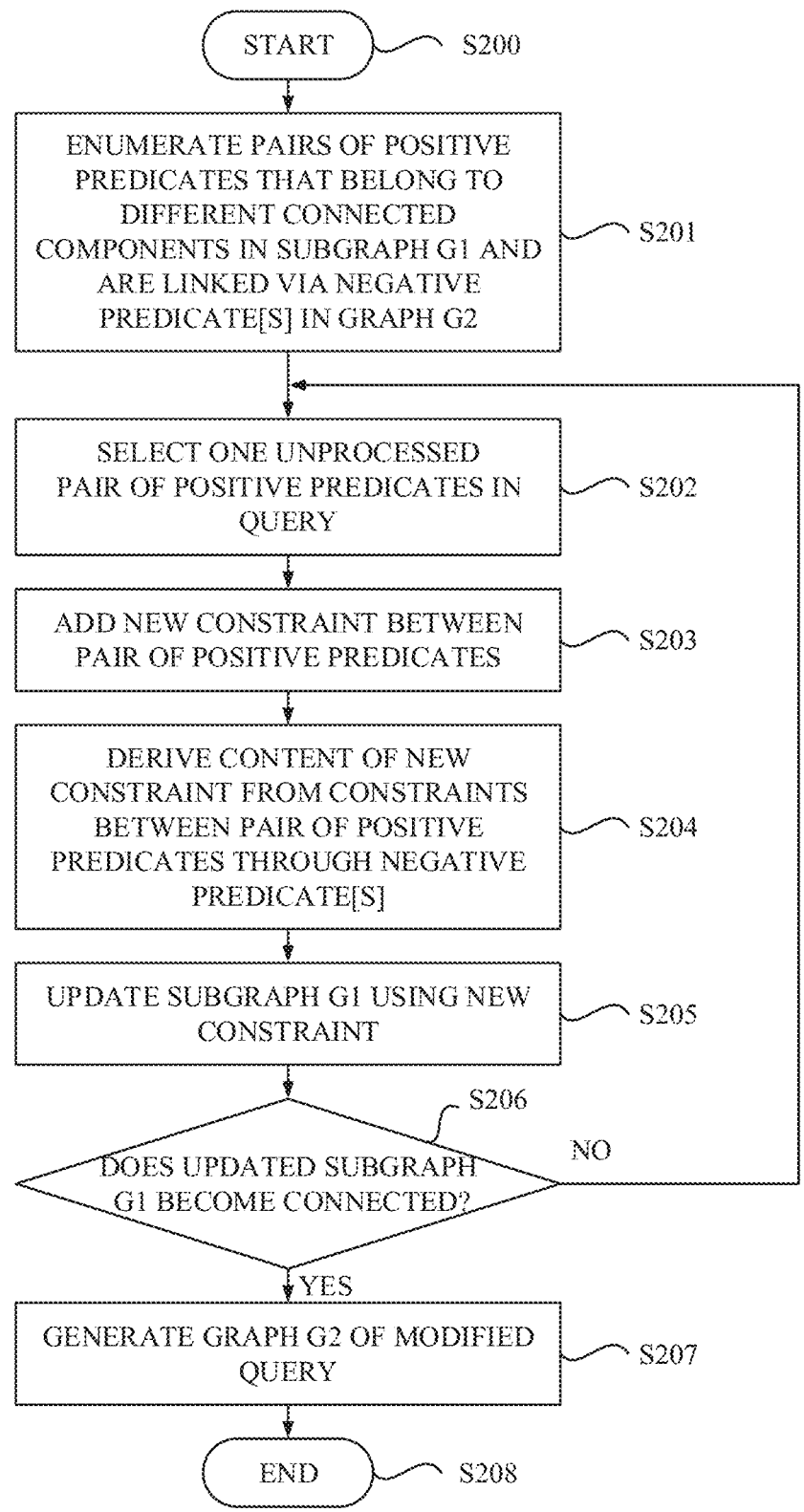
FIG. 5 is a flowchart depicting a process for correcting the search query to provide an alternative search query according to the exemplary embodiment of the present invention.

Referring to FIG. 5, a process for correcting a search query to provide an alternative search query is shown. Note that the process shown in FIG. 5 may be executed by a processing unit that implements at least the query correction module 114 shown in FIG. 1. The process shown in FIG. 5 may begin at step S200 in response to the correction process of the search query being invoked at step S109 in FIG. 4.

At step S201, the processing unit may enumerate one or more pairs of positive predicates X, Y in the subgraph G1 in a manner such that the positive predicates X, Y in each pair belong to different connected components in the subgraph G1 and have a connection with each other via one or more negative predicates Z in the graph G2.

Figure 6C:
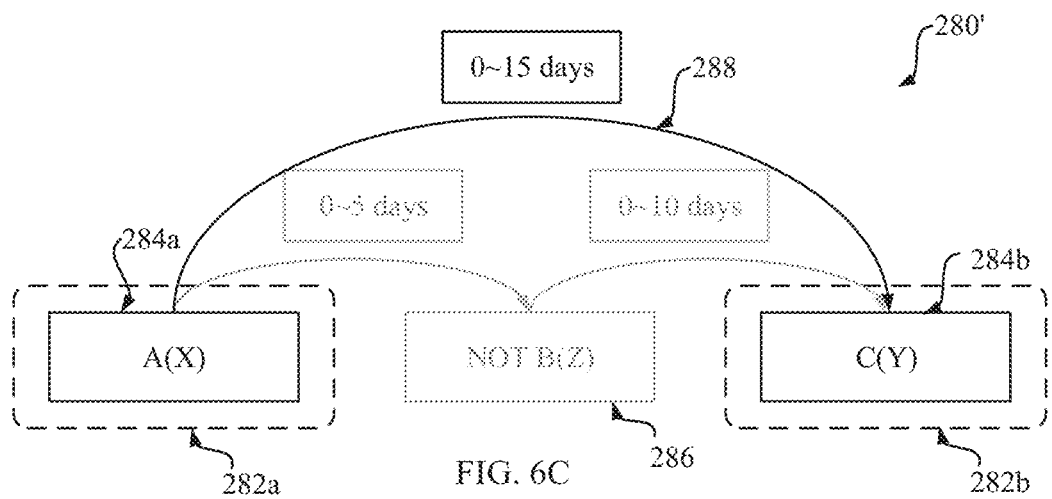

Referring further to FIG. 6C, a way of finding the pair of the positive predicates X, Y in the subgraph G1 is also described. As shown in FIG. 6C, the subgraph 280 has plural connected components 282a, 282b, each of which includes one or more positive predicates 284a, 284b, respectively. The positive predicates 284a, 284b that belong to the different connected components 282a, 282b in the subgraph 280 and have a connection with each other via the negative predicate 272 in the graph 270 (indicated by arrow 286 in FIG. 6C) are found as the pair of the positive predicates X, Y to be enumerated.

Referring back to FIG. 5, at step S202, the processing unit may select one unprocessed pair of the positive predicates X, Y among the one or more pairs enumerated at step S201. Since the process shown in FIG. 5 is invoked when the subgraph G1 has plural connected components, at least initially, there is at least one pair of the positive predicates matched with aforementioned conditions.

At step S203, the processing unit may add a new constraint between the selected pair of the positive predicates X, Y. Further referring to FIG. 6C, a way of adding the new constraint between the pair of the positive predicates in the subgraph 280 is also shown. As shown in FIG. 6C, the new constraint 288 are added between the positive predicates 284a, 284b that belong to the different connected components 282a, 282b in the subgraph 280.

At step S204, the processing unit may derive content of the new constraint based on contents of constraints (X, Z), (Z, Y) between the pair of the positive predicates X, Y through a negative predicate Z in the graph G2. In a particular embodiment, one of necessary conditions of combination of the constraints (X, Z), (Z, Y) between the pair of the positive predicates X, Y may be computed as the content of the new constraint. In a preferable embodiment, a strongest constraint in the necessary conditions may be computed as the content of the new constraint.

Let us assume that there is one negative predicate (Z) between the pair of the positive predicates (X, Y) in the graph G2, as described in FIG. 6A. In this case, content of the new constraint is the strongest constraint in necessary conditions of all constraints (X, Z), (Z, Y). For example, the necessary conditions of two constraints can be computed as follows:

(Time from X to Z: 0~5 days)/\(Time from Z to Y: 0~10 days)=(Time from X to Y: 0~20 days, 0-15 days, 0-30 days, . . . ).

The necessary conditions are a set of conditions for the positive predicates (X, Y) that should be at least satisfied in order to satisfy all of the constraints (X, Z), (Z, Y), meaning that there is no possibility of excluding elements of the negative predicate Z satisfying the constraints (X, Z), (Z, Y) even assuming the condition. Among these possible necessary conditions, the strongest condition (Time from X to Y: 0-15 days) can be selected as the content of the new constraint. Derivation of contents of a new constraint for more complex search query will be described later as a preferable embodiment.

At step S205, the processing unit may update the subgraph G1 using the new constraint. The selected pair of the positive predicates X, Y is labeled as "processed". At step S206, the processing unit may determine whether the updated subgraph G1' becomes connected or not. In response to the subgraph G1' being determined to not become connected (S206: NO), control may transfer to step S202 for further processing of unprocessed pair of the positive predicates. After that, the processing unit may perform the addition of the new constraint and the update of the subgraph repeatedly until the subgraph becomes connected.

On the other hand, in response to the subgraph being determined to be connected (S206: YES), control may transfer to step S207. Since the number of the enumerated pairs of the positive predicates is finite, the loop finishes in a finite iteration. At step S207, the processing unit may create an updated graph G2' representing a modified query by reflecting all additions of new constraints in the graph G2. Then, the process may end at step S208 and control may return back to step S110 in FIG. 4. In the process at S110, the search query modified from the search query with using the new constraint would be proposed to the user as the alternative search query.

Figure 6D:
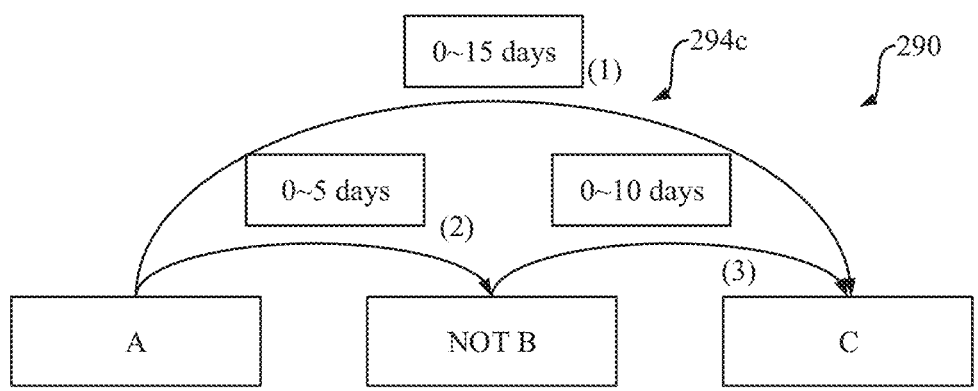

Referring to FIG. 6D, the updated graph 290 representing the modified query is illustrated. By comparing FIGS. 6A, 6D, the updated graph 290 has a structure obtained by adding the new constraint 294c to the original graph 270 of the original search query. The queries obtained in this condition would be issued to the event sequence analysis engine 120 and processed.

The valid search query (that is a search query determined to be valid at S107 in FIG. 4 or an alternative search query proposed at S110 in FIG. 4) can be processed as follows:

1. Retrieve, for each predicate $\{p_i: i=1, \ldots, N\}$ in the valid search query, a list from the event sequence data.
2. Initialize an equivalent condition C on the predicates $\{p_1, \ldots p_N\}$, which is data structure for holding relations between every pairs of predicates $p_i$, $p_j$, by following proposition:

$$p_i \sim_c p_j \Leftrightarrow i=j,$$

where $\sim_c$ denotes equivalence. Note that if relation between predicates p and q ($p \sim_c q$) is set to be equivalence in the equivalent condition C, a list of the predicate p and a list of the predicate q are said to be "linked". Also if the list of the predicate p and the list of the predicate q are "linked", when an element in one list is removed, a corresponding element at the same index of the other linked lists can be removed. By the initialization, the equivalent condition C is initialized in a manner such that each predicate $\{p_1, \ldots p_N\}$ is linked with merely itself.

3. Extract, for each constraint between a pair of predicates p and q of same type (both positive or negative) in the valid search query, a pair of respective elements satisfying each constraint from respective lists for the predicates p, q such that the respective lists for the predicates p, q of the same type is linked. Note that after extracting, the two lists have same length and elements at the same index satisfy the constraint. In a real system, it is preferable to get rid of redundancy in the result for application of a constraint. Accordingly, in a particular embodiment, if two or more pairs of elements (a1, b) and (a2, b) satisfy the constraint, the nearest one of the pairs (e.g. (a1, b)) merely) would be extracted. In other embodiment, if two or more pairs of elements (a1, b) and (a2, b) satisfy the constraint, both of the pairs (a1, b) and (a2, b) would be extracted, i.e., element b would be duplicated.

Then, relation between predicates p and q ($p \sim_c q$) is set to be equivalence in the equivalent condition C. Hence, if the list of the predicates p and lists of other predicates x has already been linked ($x \sim_c p$) and the list of the predicates q and lists of other predicates y has been already linked ($y \sim_c q$), x's lists for ($x \sim_c p$) and y's lists for ($y \sim_c q$) are also linked.

4. Determine whether or not the step 3 has finished. Note that the step 3 finishes with the equivalent condition C in which all the lists for positive predicates (predicates without Not option) are linked since the graph G2 or G2' representing the valid search query is connected.

5. Remove, for each constraint between a pair of a negative predicate p and positive predicate q in the valid search query, elements that satisfy each constraint from the list for the positive predicate q.

Figure 7:
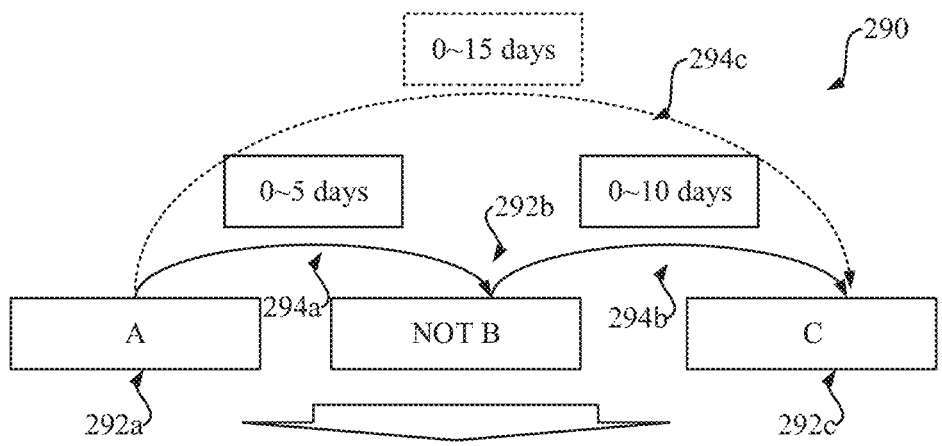
FIG. 7 describes an example of an alternative valid search query for event sequence analysis and query processing of retrieving a list of elements matched with the alternative valid search query from the event sequence data according to the exemplary embodiment of the present invention.

Referring to FIG. 7, it is described an example of an alternative valid search query 290 for event sequence analysis and query processing of retrieving a list of elements matched with the alternative valid search query 290 from the event sequence data.

The example of the alternative valid search query 290 shown in FIG. 7 includes one positive predicates 292a (denoted by "A" in FIG. 7), one negative predicate 292b (denoted by "B" in FIG. 7 with NOT option) with a constraint 294a ("0~5 days") and other positive predicate 292c (denoted by "C" in FIG. 7) with a constraint 294b ("0~10" days). The alternative valid search query 290 further includes the new constraint 294c ("0~15" days). The alternative search query 290 can be used to retrieve a list of pairs of elements satisfying statement "patients who had headache but were not prescribed loxoprofen in 5 days but had recovered within 15 day from the symptom with not being prescribed a loxoprofen in past 10 days".

The query processing of this search query 240 may typically include:

(i) a step of retrieving each list 296a, 296b, 296c for each predicate 292a, 292b, 292c (A, B, C);

A: (0, 8/10), (1, 8/3), (2, 8/5), (2, 8/18)
B: (1, 8/6), (2, 8/12), (2, 8/21), (3 8/10)
C: (0, 8/12), (1, 8/5), (2, 8/30), (3, 8/5).

The query processing of the search query 240 may also include:

(ii) a step of extracting a pair of respective elements satisfying the new constraint 294c from respective lists 296a, 296c for the predicates 292a (A) and 292c (C) such that the respective lists 296a, 296c for the predicates 292a, 292c are linked.

A: (0, 8/10), (1, 8/3), (2, 8/18)
C: (0, 8/12), (1, 8/5), (2, 8/30)

Note that the elements that are not in a pair of A and C within 15 days are filtered out from the A's list 296a and the C's list 296c after extracting, as described in FIG. 7. Linked lists 298a, 298c that have same length and whose elements at the same index satisfy the constraint are obtained.

The query processing of the search query 240 may further include:

(iii) a step of determining zero or more elements 300 in the list 296b (B) that match the constraint 294a with the positive predicate 292a (A);

(1, 8/6), (2, 8/21)

(iv) a step of determining zero or more elements 302 in the list 296b (B) that match further the constraint 294b with the positive predicate 292c (C); and (2, 8/21)

(v) a step of removing zero or more elements 304 from the linked list 298a that have one or more respective elements in the list 302.

Note that since the pair of the elements in the respective linked lists 298a, 298c are "linked", when an element 304 in one list 298a is removed, the element 306 at the same index of the other list 298c can be removed.

A: (0, 8/10), (1, 8/3)
C: (0, 8/12), (1, 8/5)

The query processing of the search query 240 may further include:

(vi) a step of removing zero or more elements from the linked list 298c that have one or more respective elements in the list 302. In this example, no element is removed from the linked list 298c.

A: (0, 8/10), (1, 8/3)
C: (0, 8/12), (1, 8/5)

Mathematical expression of the query processing will be further described below. Let us define that S denotes a set representing whole set of records, $P_1, P_2, \ldots, P_N$ denote subsets of the set S that represents the retrieved lists for the respective predicates $p_1, p_2, \ldots, p_N$, and $C_1, C_2, \ldots, C_M$ denote maps: $S \times S \rightarrow \{true, false\}$ representing the constraints, where $C(x, y) = true$ for $x, y \in S$ means that a pair of elements (x, y) satisfies the constraint C.

The whole set of the records, each of which includes an ID and time, can be represented as follow:

$$S = \{(i_1,t_1),(i_2,t_2),\ldots,(i_K,t_K)\},$$

where $i_k \in$ Integer, $t_k \in$ Real number, $k = 1, 2, \ldots, K$.

The constraint defining that the first and second records have the same ID and the second record has occurred within 5 days from the first record can be represented as follows:

$$C((i,t),(j,s)) = (i=j) \& (t<=s) \& (s<=t+5).$$

The search result for the valid query shown in FIG. 3A can be represented as follows:

$$R_1 = \{a \in P_A | (\sim \exists b \in P_B) C_{AB}(a,b)\},$$

where $C_{AB}$ (a, b) means $C_{AB}$(a, b)=true, i.e., a pair of elements (a, b) satisfies the constraint $C_{AB}$.

The search result for the invalid query shown in FIG. 3B can be represented as follows:

$$R_2 = \{(a,c) \in P_A \times P_C | (\sim \exists b \in P_B)(C_{AB}(a,b) \& C_{BC}(b,c))\}.$$

The search result for the alternative valid query shown in FIG. 7 can be represented as follows:

$$R_3 = \{(a,c) \in P_A \times P_C | C_{AB}(a,c) \& (\sim \exists b \in P_B)(C_{AB}(a,b) \& C_{BC}(b,c))\}.$$

In that case, roughly speaking, a search query can be determined "valid" by the novel validation technique when the size of the search result is at most the linear order of the size of the retrieved record lists. Note that the result of the invalid query shown in FIG. 3B can be:

$$|R_2| \sim |P_A||P_C|.$$

Referring to FIG. 8, schematics of typical user's operations that may cause an invalid query are shown. In FIG. 8, an example of a search query represented on the editing screen is also shown.

Figure 8A:
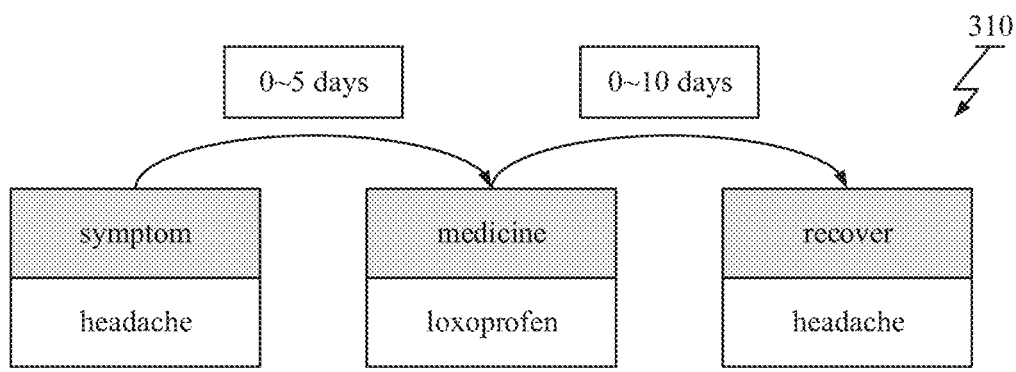
FIGS. 8A, 8B, and 8C show schematics of typical user's operations causing an invalid query together with an example of a search query represented on a editing screen of a user interface according to the exemplary embodiment of the present invention.
Figure 8B:
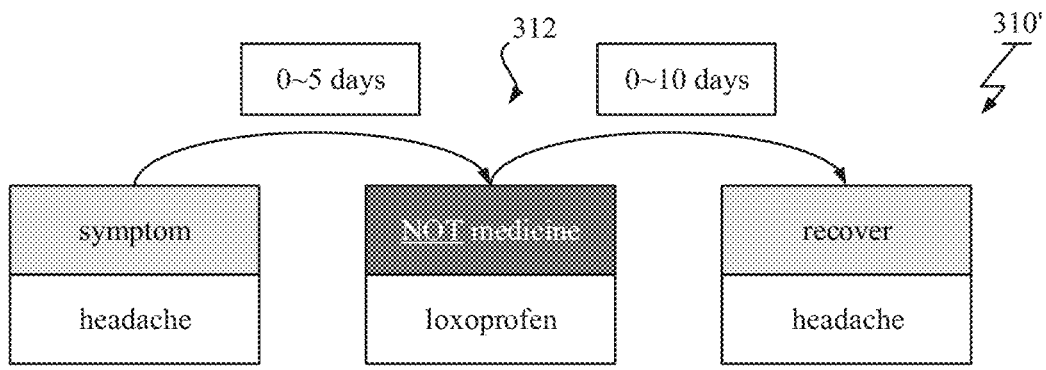

Taking the clinical data as an example, the user would wonder whether "how many patients used loxoprofen". On the editing screen a search query 310 shown in FIG. 8A would be inputted by the user according to the user's interest. Then, the user would wonder whether "what if the loxoprofen is not used". Each predicate can be specified to be positive or negative through an operation on the editing screen. On the editing screen, the search query 310 shown in FIG. 8A would be changed by setting the NOT option of the predicate 312 to be true according to the user's interest, as shown in FIG. 8B.

Figure 8C:
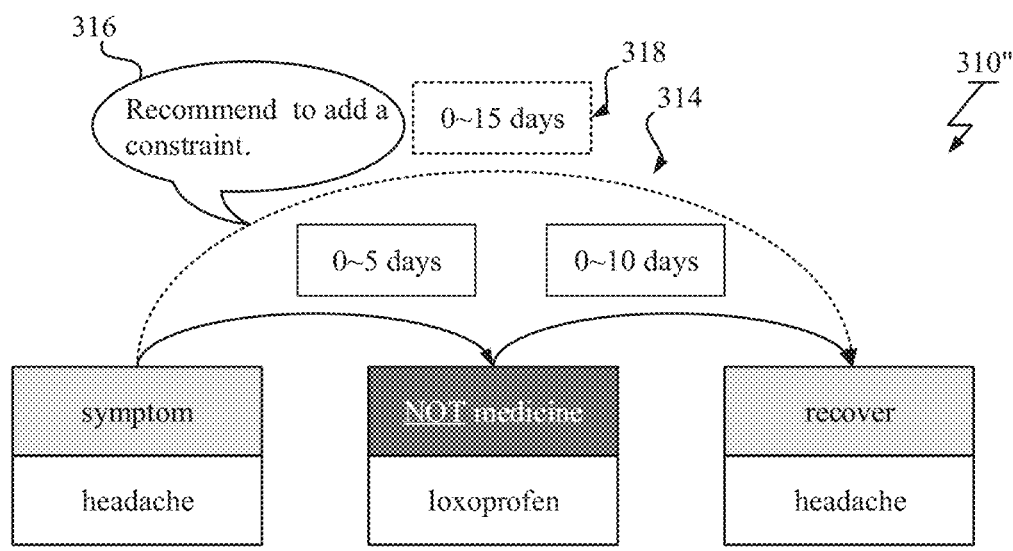

In this case, the search query 310' would be determined to be invalid by the query validation module 112 and an alternative search query 310" generated by the query correction module 114 for the original search query 310 would be presented together with visual cues (connecting curve 314 and a balloon 316) on the editing screen as shown in FIG. 8C, notifying that the search query 310' currently being displayed is invalid. The visual cue 314, 316 indicates where the new constraint is recommended to be added. Also content of the new constraint would be suggested by using an indication 318 on the editing screen. If the proposed alternative search query 310" is accepted by the user, the alternative search query 310" would become new search query.

In this example, the user's intent of the search would include "How many patients: had headache; did not use loxoprofen in 5 days; and recovered within certain period". The search user interface 110 may interpret "the certain period" as being "15 days" from the symptom, in this example.

According the exemplary embodiment, even though the search query includes a negative predicate, which generally makes it difficult to notice invalidity of the search query, validity of the search query can be examined from the viewpoint of whether or not it is expected to lead a result that does not meet intention of a user, without actually issuing the search query. Furthermore, the user can obtain the alternative query with the new constraint that is expected to be the most suitable among possible constraints obtained from the two or more constraints between the pair of the positive predicates.

In the aforementioned exemplary embodiment, a target of correction has been described as a search query having a simple structure between the pair of the positive predicate X, Y. However, the target of the correction is not limited to the aforementioned simple search query, more complex search queries determined to be invalid can also be corrected. Hereinafter, referring to the series of FIGS. 9-11, it is described a computer system and a method for checking a search query used for event sequence analysis according to a preferable embodiment of the present invention, in which more complex search query determined to be invalid can be corrected.

A block diagram of an event sequence analysis system and flowcharts of a process for checking a search query and a process for correcting a search query according to the preferable embodiment of the present invention is almost same as that of the aforementioned exemplary embodiment. Thus, hereinafter, mainly features different from the exemplary embodiment will be focused.

Similar to the exemplary embodiment, the query correction module 114 is configured to perform correction of the search query to provide an alternative search query if the original search query is determined to be invalid but to allow for correction.

In order to provide the alternative search query, the query correction module 114 is configured to find a pair of positive predicates X, Y belonging to different connected components in the subgraph G1 and to add a new constraint between the pair of the positive predicates X, Y as similar to the aforementioned exemplary embodiment. The query correction module 114 according to the preferable embodiment is further configured to derive content of the new constraint based on one or more constraints $(X, Z_1), (Z_1, Z_2), \ldots, (Z_n, Y)$ between the pair of the positive predicates X, Y through the one or more negative predicates $Z_1, Z_2, \ldots, Z_n$. The content of the new constraint may be the strongest constraint in the necessary conditions of all constraints $(X, Z_1), (Z_1, Z_2), \ldots, (Z_n, Y)$ between the pair of the positive predicates X, Y.

Figure 9:
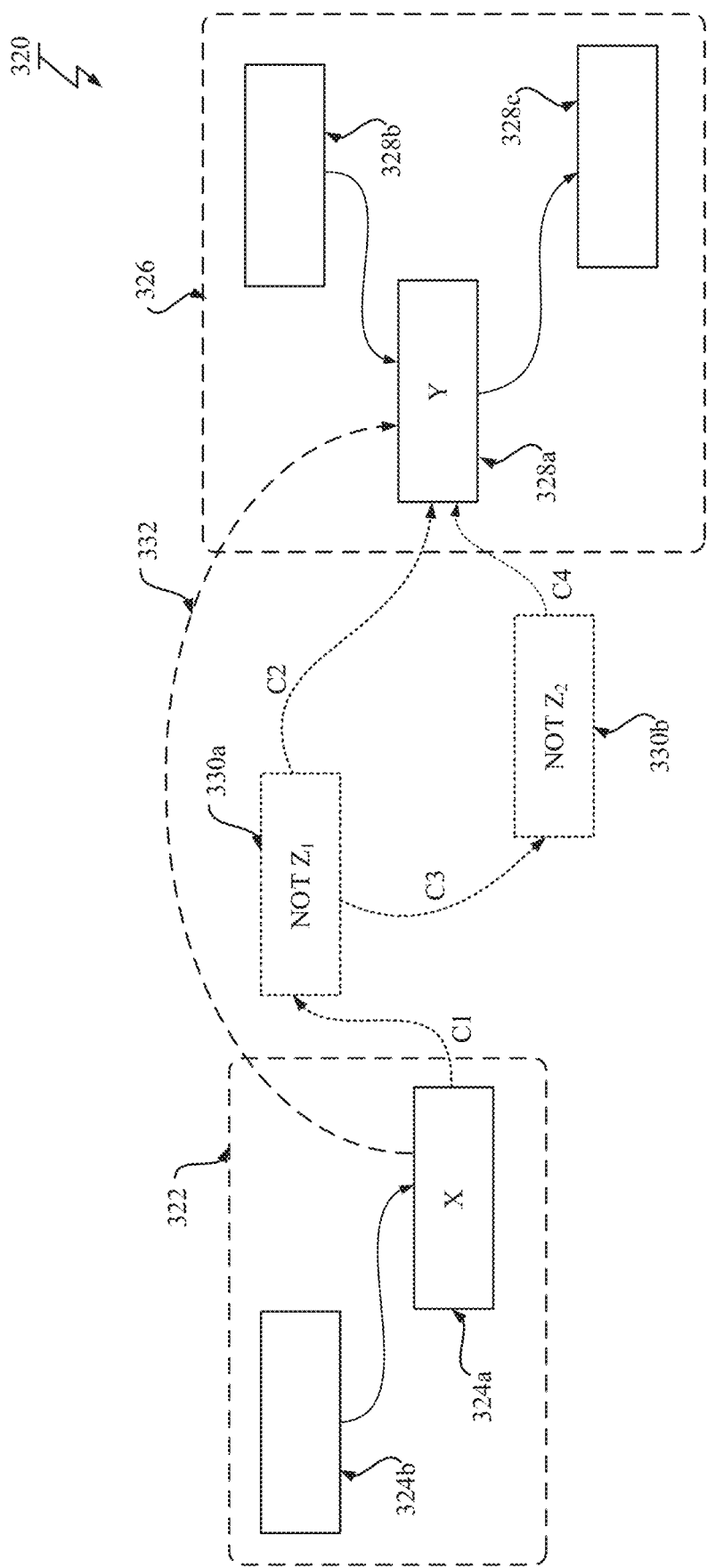
FIG. 9 show an example of a complex search query with a negative predicate for the event sequence analysis according to a preferable embodiment of the present invention.

FIG. 9 show an example of a complex search query 320 and its alternative search query with a new constraint 332. The search query 320 includes a first group 322 of two positive predicates 324a, 324b; a second group 326 of three positive predicates 328a-328c; and two negative predicates 324a, 324b between the groups 322, 326. In FIG. 9, the predicates and constraints indicated by solid and dot lines constitute a graph G2 representing the complex search query 320. The predicates and constraints indicated by solid lines merely constitute a subgraph G1. Furthermore, dash line indicates a new constraint 332 for the alternative search query.

As shown in FIG. 9, any two predicates in the search query are connected by paths, thus the graph G2 is connected. The subgraph G1 shown in FIG. 9 has plural connected components, each of which corresponds to each group 322, 326. There is the two negative predicates 330a, 330b (denoted by "$Z_1$" and "$Z_2$" with NOT option in FIG. 9, respectively) between a pair of the positive predicate 324a (denoted by "X" in FIG. 9) and the predicate 328a (denoted by "Y" in FIG. 9), which belong different connected components, respectively. There are four constraints C1~C4 between the pair of the positive predicates X, Y thought the two negative predicates ($Z_1$, $Z_2$). The four constraints C1~C4 are arranged in parallel or in series in each relationship. In the preferable embodiment, the query correction module 114 can correct such complex search query 320 by adding the new constraint 332 between the pair of the positive predicates 324a, 328a.

Figure 10:
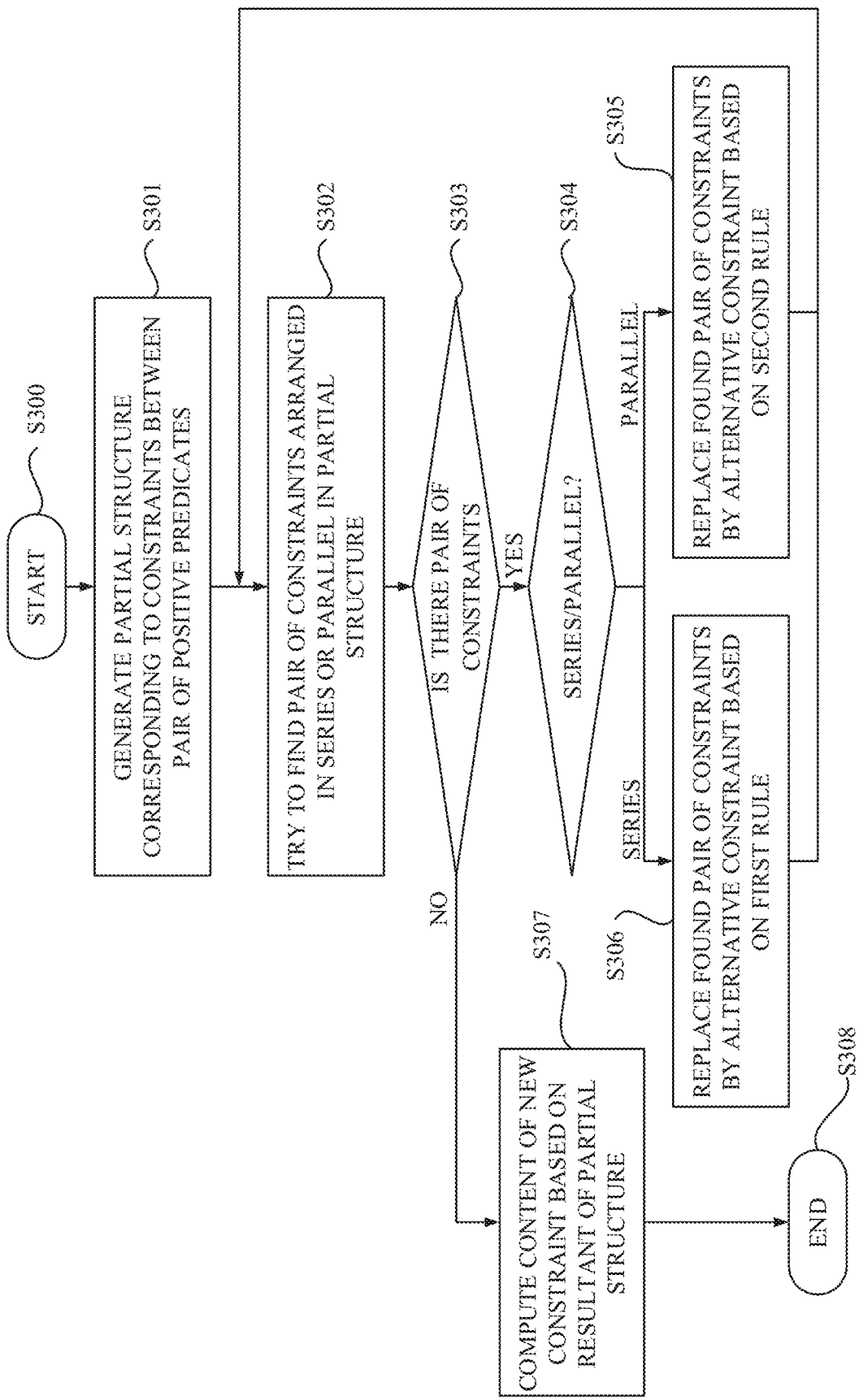
FIG. 10 is a flowchart depicting a process for deriving content of a new constraint to provide an alternative search query according to the preferable embodiment of the present invention.

Referring to FIG. 10, a process for deriving content of a new constraint between the pair of the positive predicate X, Y is described. Note that the process shown in FIG. 10 may be executed by a processing unit that implements at least the query correction module 114 shown in FIG. 1. The process shown in FIG. 10 may be a detailed processing of step S204 in FIG. 5. Thus, the process may begin at step S300 in response to invoking the derivation processing of the new constraint at step S204 in FIG. 5.

At step S301, the processing unit may generate partial structure corresponding to the constraints between the pair of the positive predicates X, Y through the negative predicates $Z_1, Z_2$ in the graph G2.

At step S302, the processing unit may try to find a pair of constraints arranged in series or in parallel. In step S302, if predicates P, Q, and R are serially connected by two constraints, the constraint between P and Q and the constraint between Q and R are found as series constraints. If predicates P, Q are connected by two parallel constraints, the pair of the two constraints between P and Q is found as a pair arranged in parallel. At step S303, the processing unit may determine whether the pair of the constraints is found or not. In response to determining that the pair of the constraints is found (S303: YES), control may transfer to step S304. At step S304, the process may branch depending on whether the constraints in the found pair are arranged in series or parallel.

In response to finding a pair of constraints arranged in parallel (S304: PARALLEL), control may branch to step S305. At step S305, the processing unit may replace the found pair of the constraints by an alternative constraint based on a first rule, then, control may loop back to step S302. In a particular embodiment, each constraint includes an interval of a time gap between predicates associated with each constraint in a form of "$t_1$~$t_2$ days". In this particular embodiment, the found pair of the constraints in the partial structure may be replaced by the alternative constraint having an alternative interval that starts at the latest of beginnings of the pair of the constraints and ends at the earliest of ends of the pair of the constraints. If predicates P and Q are connected by two parallel constraints "$s_1$~$s_2$ days" and "$t_1$~$t_2$ days", the two constraints would be replaced by one alternative constraint "max$\{s_1, t_1\}$~min$\{s_2, t_2\}$ days"

In response to finding a pair of constraints arranged in series (S304: SERIES), control may branch to step S306. At step S306, the processing unit may replace the found pair of the constraints by an alternative constraint based on a second rule, then, the control may loop back to step S302. In a particular embodiment in which each constraint includes the interval of the time gap between the predicates, the found pair of the constraints in the partial structure may be replaced by the alternative constraint having an alternative interval that starts at a sum of beginnings of the pair of the constraints and ends at a sum of ends of the pair of the constraints. In case where predicates P, Q and R are serially connected by two constraints "$s_1$~$s_2$ days" and "$t_1$~$t_2$ days", the two constraints would be replaced by one alternative constraint "$s_1$+$t_1$~$s_2$+$t_2$ days".

In response to finding no pair of constraints arranged in series or parallel (S303: NO), control may branch to step S307. At step S307, the processing unit may compute content of the new constraint based on the resultant of the partial structure that is obtained and the process ends at step S308.

Referring to FIG. 11, an example of way of deriving the content of the new constraint and correcting the search query are shown. As shown in FIG. 11A, there are four constraints C1~C4 between the pair of the positive predicates X, Y thought the two negative predicates ($Z_1$, $Z_2$). The constraints C1, C2, C3 and C4 are "0~3 days", "0~5 days", "0~2 days" and "0~4 days", respectively.

Figure 11A:
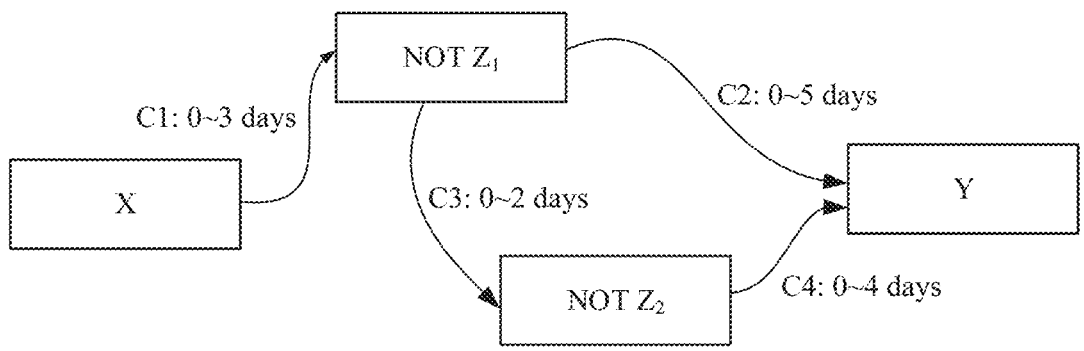
FIGS. 11A, 11B, 11C, 11D, and 11E describe an example of way of deriving the content of the new constraint and correcting the search query according to the preferable embodiment of the present invention.
Figure 11B:
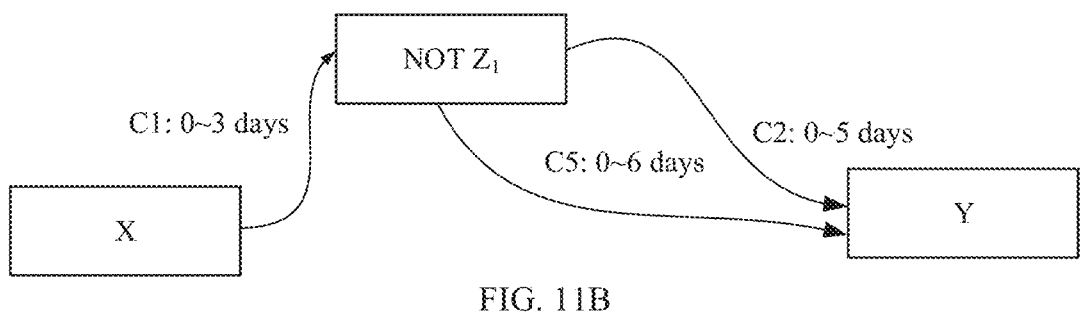
Figure 11C:
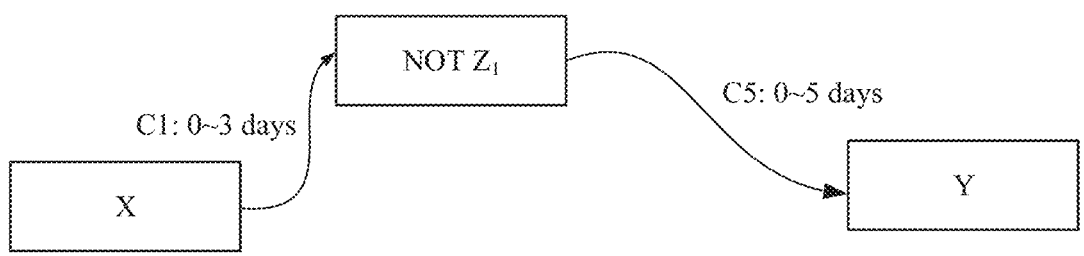
Figure 11D:
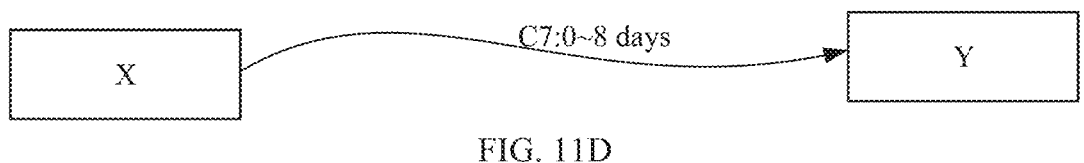

At first, the constraints C3 and C4 are found to be a pair arranged in series. Thus, the constraints C3 and C4 would be replaced with a new alternative constraint C5 "0~6 days" between $Z_1$ and Y (based on the second rule) as shown in FIG. 11B. Then, the constraints C2 and C5 are found to be a pair arranged in parallel. Thus, the constraints C2 and C5 would be replaced with a new alternative constraint C6 "0~5 days" between $Z_1$ and Y (based on the first rule) as shown in FIG. 11C. The constraints C1 and C6 are found to be a pair arranged in series and the constraints C1 and C6 would be replaced with a new alternative constraint C7 "0~8 days" between X and Y (based on the second rule) as shown in FIG. 11D.

Figure 11E:
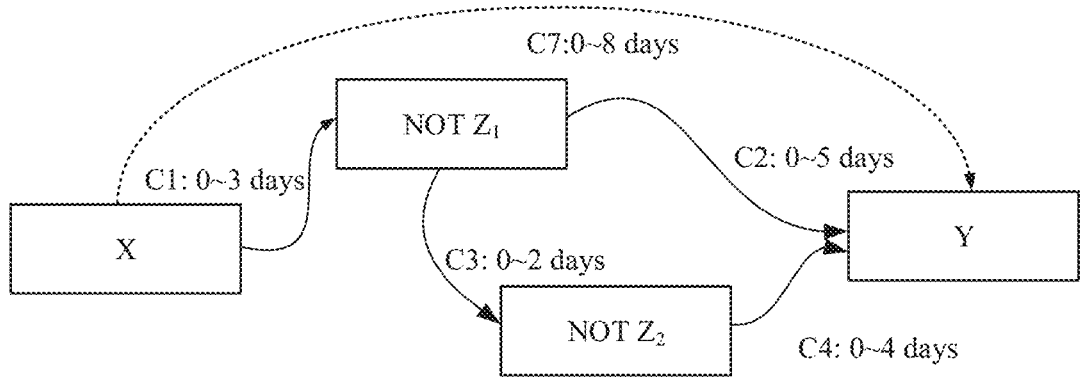

As shown in FIG. 11E, the content of the new constraint that is C7 "0~8 days" would be computed based on the resultant of the partial structure that is obtained.

The aforementioned first rule for parallel constraints can be generalized as follows: Parallel constraints C1 and C2 would be replaced by an alternative constraint in a manner such that the alternative constraint is a conjunction of the parallel constraints (C1 AND C2).

The aforementioned second rule for series constraints can be generalized as follows: Series of a constraint C1 between predicates P and Q and a constraint C2 between predicates Q and R would be replaced by an alternative constraint between predicates P and R in a manner such that an intermediate predicate Q satisfying both of the constraints C1, C2 exists (equivalent to "($\exists$Q) ((P, Q) satisfies C1 AND (Q, R) satisfies C2)".

According the preferable embodiment, even though the search query has a complex structure, such complex search query determined to be invalid can be corrected. The user can obtain the alternative query with the new constraint that is expected to be the most suitable according to the two or more constraints between the pair of the positive predicates.

In cases where a query does not have a Not option, it is not difficult to recognize invalidity of a search query since invalid query has a structure of a graph that is not connected. However, it is difficult to notice that even a query having connected graph structure can be invalid when the query has a Not option. It is not trivial to consider that the system can understand a user's intent from an invalid query.

Although the event sequence analysis engine 120 may validate a search query during its search process, however, that is not enough since it is preferable that user interface can show the reason for failure of a search to distinguish an invalid query from a system error. By using the novel query validation functionality according to one or more embodiments of the present invention, the search user interface 110 can detect an invalid query without issuing actually the search query. Furthermore, by using the query correction functionality according the one or more embodiments of the present invention, the search user interface 110 can correct the invalid query. The validation and correction allow a user to recognize the gap between their intent and the query they created.

Computer Hardware Component

Figure 12:
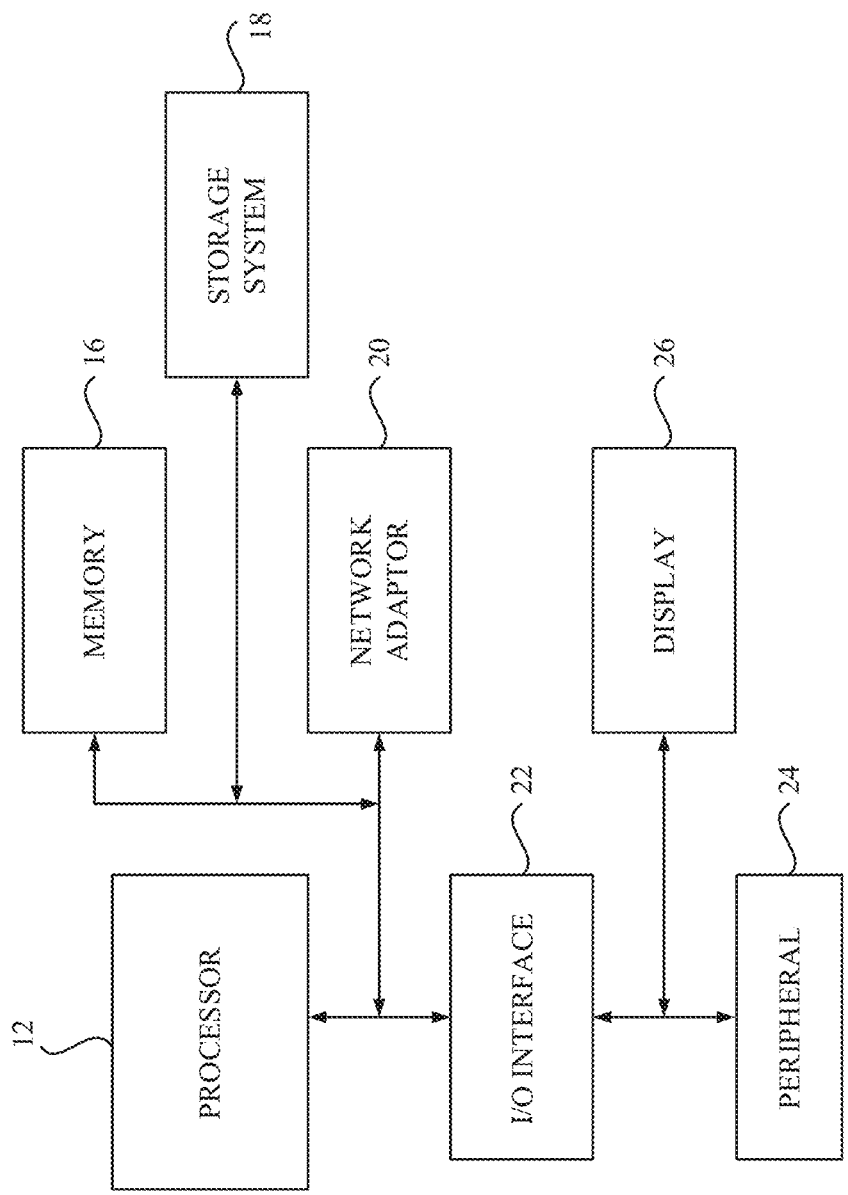
FIG. 12 depicts a computer system according to one or more embodiments of the present invention.

Referring now to FIG. 12, a schematic of an example of a computer system 10, which can be used for the event sequence analysis system 100, is shown. The computer system 10 shown in FIG. 12 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 12, the computer system 10 is shown in the form of a general-purpose computing device. The components of the computer system 10 may include, but are not limited to, a processor (or processing unit) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

In particular embodiments, the module 110 and its sub-modules 112, 114 in the event sequence analysis system 100 described in FIG. 1 may be implemented as, but not limited to, a software module including program instructions and/or data structures in conjunction with hardware components shown in FIG. 12; a hardware module including electronic circuitry; or a combination thereof. The modules 110 and its submodules 112, 114 described in FIG. 1 may be implemented in a single computer system shown in FIG. 12. The event sequence analysis engine 120 and the event record system 140, respectively, can be implemented on the computer system 10 on which the modules 110 and its submodules 112, 114 are implemented or other computer system. The event collection database 130 may be provided by using any internal or external storage device or medium, to which the computer system 10 can access.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for checking a search query used for retrieving information from a collection of records, the method comprising:
   receiving a search query including a plurality of predicates and one or more constraints wherein each of the one or more constraints is associated with plural predicates, wherein each predicate of the plurality of predicates is specified as matching or excluding, and wherein the plurality of predicates, together with the one or more constraints, form a logical graph;
   generating a subgraph from the formed logical graph by removing one or more predicates specified as excluding among the plurality of the predicates in the search query; and
   invalidating the search query when the generated subgraph has plural connected components.

2. The method of claim 1, wherein the method further comprises:
   providing an alternative query, when the generated subgraph has plural connected components, by adding a new constraint between pair of predicates belonging to different components in the subgraph, the pair of predicates having a connection with each other via one or more predicates specified to be excluding, in the graph.

3. The method of claim 2, wherein the method further comprises:
   deriving content of the new constraint from two or more constraints between the pair of predicates via one or more predicates specified to be excluding.

4. The method of claim 3, wherein the deriving comprises:
   calculating a strongest constraint in necessary conditions of combination of the two or more constraints between the pair of predicates as the content of the new constraint.

5. The method of claim 3, wherein the two or more constraints include an interval of a time gap or distance between the pair of predicates associated with the two or more constraints and the deriving comprises:
   generating a partial structure representing the two or more constraints between the pair of predicates;
   finding a first pair of constraints arranged in series in the partial structure;
   replacing the first pair of constraints in the partial structure by a first alternative constraint having a first alternative interval, the first alternative interval starting at a sum of beginnings of the first pair of constraints and ending at a sum of ends of the first pair of constraints; and
   computing the content of the new constraint from the partial structure obtained.

6. The method of claim 3, wherein the two or more constraints includes an interval of a time gap, or distance, between the pair of predicates associated with the two or more constraints and the deriving comprises:
   generating a partial structure representing the two or more constraints between the pair of predicates;
   finding a second pair of constraints arranged in parallel in the partial structure;
   replacing the second pair of constraints in the partial structure by a second alternative constraint having a second alternative interval, the second alternative interval starting at a maximum of beginnings of the second pair of constraints and ending at a minimum of ends of the second pair of constraints; and
   computing the content of the new constraint from the partial structure obtained.

7. The method of claim 3, wherein the deriving comprises:
   generating a partial structure representing the two or more constraints between the pair of predicates;
   finding a first pair of constraints arranged in series;
   replacing the first pair of constraints by a first alternative constraint such that there exists an intermediate predicate satisfying the two or more constraints in the first pair of constraints;
   finding a second pair of constraints arranged in parallel;
   replacing the second pair of constraints by a second alternative constraint such that the second alternative constraint is a conjunction of the two or more constraints in the second pair of constraints; and
   computing the content of the new constraint from the partial structure obtained.

8. The method of claim 2, wherein providing the alternative query comprises:
updating the subgraph using the new constraint; and
proposing the alternative query modified from the search query with using the new constraint, in response to the subgraph being determined to become connected; or
performing the adding and the updating repeatedly until the subgraph becomes connected, in response to the subgraph being determined to not become connected.

9. The method of claim 2, wherein the method further comprises:
invalidating the search query and giving up providing the alternative query, in response to the graph being determined to be disconnected; or
determining the search query being to be valid in response to the graph being determined to be connected and the subgraph being determined to have a single component.

10. The method of claim 1, wherein the search query is received through a graphical user interface on which the search query is editable and the alternative query is presented by a visual cue in the graphical user interface, the visual cue indicating where the new constraint is recommended to be added.

11. The method of claim 1, wherein each predicate is represented by a node and each constraint is represented by an edge in the graph and the subgraph, and each predicate specified to be excluding is a negation of a predicate, each predicate being used for retrieving a list from the collection, each constraint being used for extracting a pair of respective elements satisfying the constraint from respective lists for predicates associated with each constraint.

12. The method of claim 2, wherein the method further comprises:
retrieving, for each predicate in the alternative search query, a list from the collection of the record;
extracting, for each constraint between a pair of predicates of same type in the alternative search query, a pair of respective elements satisfying each constraint from respective lists for the predicates associated with each constraint such that the respective lists retrieved for the predicates of the same type is linked; and
removing, for each constraint between a pair of a first predicate specified to be matching and a second predicate specified to be excluding in the alternative search query, an element satisfying each constraint from a list corresponding to the first predicate.

13. A computer-implemented method for checking a search query used for retrieving information from a collection of records, the method comprising:
receiving a search query including a plurality of predicates and one or more constraints wherein each of the one or more constraints is associated with plural predicates, wherein each predicate of the plurality of predicates is specified as matching or excluding, and wherein the plurality of predicates, together with the one or more constraints, form a logical graph;
generating a subgraph from the formed logical graph by removing one or more predicates specified as excluding among the plurality of the predicates in the search query;
finding a pair of predicates in the subgraph such that the one or more predicates in the pair belong to different components in the subgraph; and
adding a new constraint between the pair of predicates to provide an alternative query, the new constraint having content derived from two or more constraints between the pair of predicates in the graph.

14. The method of claim 13, wherein the method further comprises:
invalidating the search query when the generated subgraph has plural connected components.

15. The method of claim 13, wherein the content of the new constraint is a strongest constraint in necessary conditions of combination of the two or more constraints.

16. A computer system for checking a search query used for retrieving information from a collection of records, by executing program instructions, the computer system comprising:
a memory tangibly storing the program instructions;
a processor in communication with the memory for executing the program instructions, the program instructions comprising instruction to:
receiving a search query including a plurality of predicates and one or more constraints wherein each of the one or more constraints is associated with plural predicates, wherein each predicate of the plurality of predicates is specified as matching or excluding, and wherein the plurality of predicates, together with the one or more constraints, form a logical graph;
generating a subgraph from the formed logical graph by removing one or more predicates specified as excluding among the plurality of the predicates in the search query; and
invalidating the search query when the generated subgraph has plural connected components.

17. The computer system of claim 16, wherein the computer system is further configured to:
provide an alternative query by adding a new constraint between a pair of predicates belonging to different components in the subgraph in response to the subgraph being determined to have plural connected components, wherein the pair of predicates have a connection with each other via one or more predicates specified to be excluding, in the graph.

18. The computer system of claim 17, wherein the computer system is further configured to:
derive content of the new constraint from two or more constraints between the pair of predicates through the one or more predicates specified to be excluding.

19. The computer system of claim 18, wherein the computer system is further configured to:
calculate a strongest constraint, in necessary conditions of combination of the two or more constraints, between the pair of predicates as the content of the new constraint.

20. The computer system of claim 18, wherein the two or more constraints include an interval of a time gap, or distance, between predicates associated with the two or more constraints and the computer system is further configured to:
generate partial structure representing the two or more constraints between the pair of predicates;
find a first pair of constraints arranged in series in the partial structure;
replace the first pair of constraints in the partial structure by a first alternative constraint having a first alternative interval, wherein the first alternative interval starts at a sum of beginnings of the first pair of constraints and ends at a sum of ends of the first pair of constraints; and
compute the content of the new constraint from the partial structure obtained.

21. The computer system of claim 18, wherein the two or more constraints include an interval of a time gap, or distance, between predicates associated with the two or more constraints and the computer system is further configured to:

generate a partial structure representing the two or more constraints between the pair of predicates;

find a second pair of constraints arranged in parallel in the partial structure;

replace the second pair of constraints in the partial structure by a second alternative constraint having a second alternative interval, wherein the second alternative interval starts at a maximum of beginnings of the second pair of constraints and ends at a minimum of ends of the second pair of constraints; and compute the content of the new constraint from the partial structure obtained.

22. A computer program product for checking a search query used for retrieving information from a collection of records, the computer program product comprising a computer readable storage medium having program instructions embodied therewith, the program instructions being executable by a computer to cause the computer to perform the method comprising:

receiving a search query including a plurality of predicates and one or more constraints where each of the one or more constraints is associated with plural predicates, wherein each predicate of the plurality of predicates is specified as matching or excluding, and wherein the plurality of predicates, together with the one or more constraints, forms a logical graph;

generating a subgraph from the formed logical graph by removing one or more predicates specified as excluding among the plurality of the predicates in the search query; and invalidating the search query when the generated subgraph has plural connected components.

23. The computer program product of claim 22, wherein the method further comprises:

further providing an alternative query, in response to the subgraph being determined to have plural connected components, by adding a new constraint between a pair of predicates belonging to different components in the subgraph, the pair of predicates having a connection with each other via one or more predicates specified to be excluding, in the graph; and deriving content of the new constraint from two or more constraints between the pair of predicates through the one or more predicates specified to be excluding.

24. A computer program product for providing a user interface on which a search query used for retrieving information from a collection of records is editable, the computer program product comprising a computer readable storage medium having program instructions embodied therewith, the program instructions being executable by a computer to cause the computer to perform the method comprising:

providing a screen of the user interface on which a search query is graphically represented in a form of a graph, each predicate in the search query being represented by a node in the graph, each constraint associated with plural predicates in the search query being represented by an edge in the graph, each predicate being specified to be matching or excluding through an operation on the screen;

notifying that the search query currently being displayed is invalid if a subgraph including one or more predicates specified to be matching in the search query has plural connected components.

25. The computer program product of claim 24, wherein the method further comprises:

in response to notifying that the search query is invalid, proposing visually an addition of a new constraint between a pair of predicates belonging to different components in the subgraph, the pair of predicates having a connection with each other via one or more predicates specified to be excluding in the graph; and suggesting content of the new constraint on the screen, the content of the new constraint being a strongest constraint in necessary conditions of combination of two or more constraints between the pair of predicates in the search query.

\* \* \* \* \*